United States Patent
Wright et al.

(10) Patent No.: US 10,956,810 B1
(45) Date of Patent: Mar. 23, 2021

(54) ARTIFICIAL INTELLIGENCE ANALYSIS OF TEST STRIP METHOD, APPARATUS, AND SYSTEM

(71) Applicant: AUDERE, Seattle, WA (US)

(72) Inventors: Less Wright, Sammamish, WA (US); Jenny Abrahamson, Seattle, WA (US); Michael Marucheck, Bellevue, WA (US)

(73) Assignee: Audere, Seattle, WA (US)

( * ) Notice: Subject to any disclaimer, the term of this patent is extended or adjusted under 35 U.S.C. 154(b) by 0 days.

(21) Appl. No.: 17/102,000

(22) Filed: Nov. 23, 2020

(51) Int. Cl.
*G06N 3/04* (2006.01)
*G06N 20/00* (2019.01)
*G06N 3/08* (2006.01)

(52) U.S. Cl.
CPC .......... *G06N 3/0454* (2013.01); *G06N 20/00* (2019.01); *G06N 3/088* (2013.01)

(58) Field of Classification Search
None
See application file for complete search history.

(56) References Cited

U.S. PATENT DOCUMENTS

| | | | |
|---|---|---|---|
| 9,903,857 B2 | 2/2018 | Polwart et al. | |
| 2005/0203353 A1 | 9/2005 | Ma et al. | |
| 2006/0222567 A1 | 10/2006 | Kloepfer et al. | |
| 2010/0045789 A1 | 2/2010 | Fleming et al. | |
| 2010/0254581 A1 | 10/2010 | Neeser et al. | |

FOREIGN PATENT DOCUMENTS

WO 2012/131386 A1 10/2012

OTHER PUBLICATIONS

International Search Report dated Jul. 27, 2012, for PCT/GB2012/050717, filed Mar. 30, 2012.
Written Opinion dated Jul. 27, 2012, for PCT/GB2012/050717, filed Mar. 30, 2012.
Mingxing Tan, Quoc V. Le, "MixConv: Mixed Depthwise Convolutional Kernals", published in arXiv by Google Brain; 1907.09595v3, Dec. 1, 2020, all pages.
Nicolas Carion, Francisco Massa, Gabriel Synnaeve, Nicolas Usunier, Alexander Kirillov, and Sergey Zagoruyko, "End-to-End Object Detection with Transformers", published by Facebook AI research publications, May 27, 2020, all pages.
Hang Zhang, Chongruo Wu, Zhongyue Shang, Yi Shu, Haibin Lin, Shi Shang, Yue Sun, Tong He, Jonas Mueller, R. Manmatha, Mu Li, Alexander Smola, "ResNeSt: Split-Attention Networks", published in arXiv by Facebook, UC Davis, Snap, Amaon, ByteDance, SenseTime, Dec. 30, 2020, all pages.

*Primary Examiner* — Stanley K. Hill
(74) *Attorney, Agent, or Firm* — Æon Law; Adam L.K. Philipp; Martin Spencer Garthwaite

(57) ABSTRACT

Methods, apparatus, and system to determine a result of a diagnostic test strip comprising a machine learning transformer architecture which parallel processes input.

19 Claims, 10 Drawing Sheets

ARTIFICIAL INTELLIGENCE ANALYSIS OF TEST STRIP METHOD, APPARATUS, AND SYSTEM

FIELD

The present disclosure relates to a computing device, in particular to a computing device to read and determine a result of an interaction between an analyte and a reagent.

BACKGROUND

Lateral flow tests, also known as lateral flow immunochromatographic assays, diagnostic test strips, rapid diagnostic tests, assays, assay devices, or test strips, are used to detect the presence of one or more target substances in a liquid sample. Generally, a sample or analyte in a test liquid, is placed on a paper, capillary bed, microstructured polymer, sintered polymer, conduit, or the like ("capillary bed"). Capillary flow in the capillary bed draws the test liquid over, through, or into a reactive substance, also referred to as a conjugate or reagent. The reagent interacts with the analyte and flows through, over, or into one or more test zones and a control zone. Generally, the test zone(s) exhibit a signal when the reagent has reacted with a target substance or analyte in the test liquid. Generally, the control zone(s) exhibit a signal when the test liquid has flowed through the reagent and when the reagent is active. Generally, the signal is a change in color, such as a change from a white test zone or control zone to a red line in the test zone and or control zone, though other signals may be used, such as a change in pattern, a change in a magnetic field, or a change in electrical conductivity. In some assays the signal may be readily detected by a user (e.g. a visible color change) and in others a detector or reader may be required to determine if a positive or negative signal is present (e.g. where the signal is an electrical or magnetic field).

A lateral flow test strip may be configured as a strip of paper or capillary bed. The capillary bed may be in a frame. The frame may comprise "windows", wherein the windows allow a view of or access to the capillary bed. A combination of a test strip and a frame may be referred to as an assay, assay device, or as a test strip. A portion of the frame and or capillary bed may be dipped in the test liquid or the test liquid may be poured over a portion of the frame and or capillary bed. Some assays may require addition of a buffer or similar liquid in addition to or in conjunction with the test liquid.

Lateral flow test strips are used, for example, to test for the presence of chemicals, compounds, bio-molecules, immune cells, cells, and the like in liquids, such as water, urine, other bodily fluids, or the like. For example, lateral flow test strips may be used to determine a pH of a liquid, whether a test subject is pregnant, whether a test subject has a disease biomarker, a presence of a chemical in water or another liquid, whether a test subject has been exposed to a chemical, and the like. Lateral flow test strips may be designed for home use, such as pregnancy tests. Lateral flow test strips may be designed for clinical or business use, such as some diagnostic tests or chemical tests. Lateral flow test strips may be utilized to detect a variety of analytes and may be used in settings where a fairly fast and inexpensive test for one or more analytes is desirable. In many uses, a test strip is desirable that yields a result in an hour or less, often 30 minutes or less. Generally, lateral flow test strips provide a qualitative result, though they may also provide a quantitative result, such as through multiple test zones or through intensity of an expressed signal.

Lateral flow test strips may have to be properly handled in order to return a result or in order for a result to be meaningful. For example, the test liquid may have to be applied to one end of the lateral flow test strip, a sufficient quantity of test liquid may have to be applied, a temperature of the test liquid and or lateral flow test strip may be required, a period of time may be required to elapse after the test liquid is applied to the lateral flow test strip and before a result is read, or the like. In addition, an individual or device must read the lateral flow test strip, interpret a result, and may report the result.

Cell phones and digital cameras have been used to obtain images of lateral flow test strips, wherein the images may be interpreted by a human or by a machine. Legacy machine approaches may use cell phones and other image capture devices to obtain and interpret lateral flow test strips using legacy image processing technologies. These legacy image processing technologies may search for and detect a first geometric or other pattern within a set of pixels, such as a geometric pattern consistent with a test strip, and may search for and detect whether a second geometric pattern, such as a line in a test or control zone of the test strip, occurs within pixels within the first geometric pattern.

These legacy approaches may require that test strip images be oriented in a consistent direction, so that the geometric pattern of the test strip and of regions within the test strip can be detected. Consequently, legacy machine approaches are sensitive to rotational misalignment or skew of the image. Legacy approaches are known to reject images if the images exhibit (even spurious) signs of rotational misalignment or skew, such as misalignment or skew beyond a threshold or degree of error. Legacy approaches would require that users present the image processing system with a specific type of test strip corresponding to specific geometric patterns in this specific type of test strip; legacy approaches may not have allowed presentation of multiple different types of test strips in one session, without switching between different test strip recognition models. Legacy approaches are sensitive to a wide range of image defects, such as focus, rays of light, low or high contrast, fingers, hair, other objects in an image, or the like, which may result in mis-identification of pixel patterns, mis-identification of rotational misalignment or skew, and the like. Legacy approaches may require a significant programming staff to program the testing system for different types of test strips.

Legacy approaches may require a recursive computer processing architecture to recursively identify geometric pixel patterns, or a computer processing architecture which does not parallel process input using a range of processors. Recursive computer processing architectures and non-parallel processing architectures may be slow, and or may not utilize available compute resources efficiently, such as because a recursive process or a non-parallel process must finish before a next step in the process can be performed (or redundant recursive processes must be performed, with full data sets, which is computationally expensive), even if compute resources are available to perform the next step.

DETAILED DESCRIPTION

Figure 1:
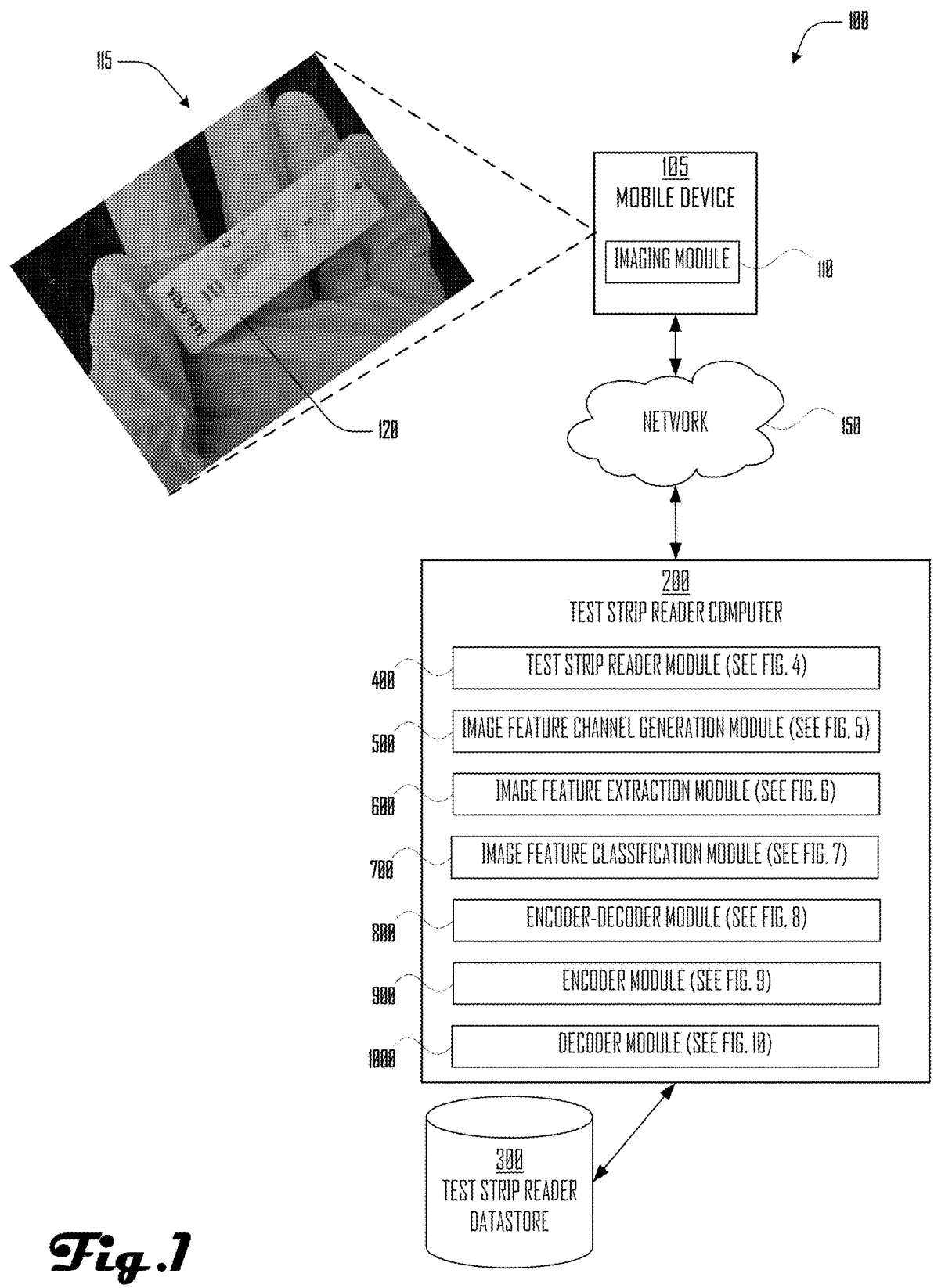
FIG. 1 is a network and device diagram illustrating an example of a test strip in a setting, a mobile device imaging the test strip and setting, and a transformer test strip reader computer device and a network incorporated with teachings of the present disclosure, according to some embodiments.

In addition to other locations, defined terms may be found at an end of this Detailed Description.

In overview, this disclosure relates to an apparatus and methods performed by and in a test strip reader computer device apparatus. The test strip reader computer device apparatus may comprise a machine learning test strip reader module, namely a test strip reader module with a transformer architecture, wherein the transformer architecture may operate on an input image of a test strip in a parallel process. The test strip reader module may operate on input images regardless of an orientation or skew of the input images. The test strip reader module may be trained on multiple different types of test strips and may be used with any of the trained multiple types. For example, multiple different types of test strips may be fabricated with a variety of frames, may be fabricated to work with different test liquids, and or may be fabricated to detect a variety of analytes. During use, the test strip reader module may be presented with and return results regarding images of any of the types of test strips it has been trained on. The test strip reader computer device apparatus may include one or more computer devices, each of which may perform some or all of the test strip reader module. For example a mobile computer, such as a tablet or mobile phone, may be configured to operate as a test strip reader computer device apparatus and to perform a test strip reader module. For example, a mobile computer may be configured to obtain images of test strips, transmit the images to a remote server computer, wherein the remote server computer performs a remainder of the test strip reader module. A number of filters within a test strip reader module may depend on available compute resources; a remote server computer may have more compute resources to perform the test strip reader module with more filters, in comparison to a mobile computer.

Deep learning systems such as recurrent neural networks have been developed in which connections between nodes form a directed graph along a temporal sequence. Recurrent neural networks comprise memory or feedback loops, in which connections within hidden layers within a neural network feedback on themselves. A recurrent neural network may be visualized as multiple copies of a neural network, with the output of one neural network serving as input to a next neural network. These feedback loops produce a current state for a given input, wherein the current state is based at least in part on a previous hidden state of the data sample, thereby allowing recurrent neural networks to recognize patterns in data. Recursive neural networks may be understood as a type of recurrent neural network in which a set of weights are applied recursively over a differentiable graph-like structure by traversing the structure in topological order. For example, recursive neural networks successfully determine continuous representations of phrases and sentences based on word embeddings in natural language processing applications, such as translation, text prediction, syntactic parsing, and sentiment analysis. Word embeddings map words to tensors of real numbers, based on, for example, frequency of word co-occurrence.

However, recurrent neural networks, including recursive neural networks, require significant computational resources to train the neural network and to use the neural network to produce a result in a useful period of time.

More recently, machine learning transformer data processing architectures have been developed to parallel process input without a recursive architecture. For example, transformer architectures have been developed to perform neural network machine translation of natural languages, wherein words within an input sentence are processed in parallel in order to, for example, translate the input sentence into another language. Rather than using a recursive architecture to understand how the different words of the input sentence can be predicted relative to a word embedding matrix, transformer architectures use multiple "attention heads" to process the words (or groups of words) of the input sentence in parallel. Each attention head focuses on a specific word (or group of words) and determines the effect of other words in the input sentence on the specific word based on a weighting of the other words, wherein the weighting is normalized with, for example, a softmax function.

In this manner, transformer architectures can parallel process input data in series, without computationally expensive recursive processes, and can determine relationships among components of an input series, relative to a statistical model of a structure of the components (e.g. relative to a word embedding).

Transformer architectures are being refined to further reduce computational demands of specific steps. For example, softmax functions within transformer architectures may exhibit quadratic complexity with respect to length of input, e.g. $O(N^2)$, where N is the input sequence length. Techniques which incorporate assumptions, or which tradeoff some accuracy for reduced complexity, or which replace the quadratic step with a kernelized function and which approximate the softmax step with positive orthogonal random features have been developed which exhibit a transformer architecture with linear complexity with respect to length of input. In addition, training or "transfer learning" for layers within transformers can be accomplished through use of filter repositories; wherein encoder-decoder layers are deployed and wherein preliminary filters, such as filters which identify objects, in general, used by preliminary of the encoder-decoder layers may be obtained from repositories. Training of later encoder-decoder layers may require training on specific tasks The test strip reader computer apparatus may include a hardware acceleration module to accelerate the performance of the modules by hardware of the test strip reader computer apparatus, for example, to allow a test strip reader module 400 and transformer architectures therein to operate in what a user perceives as real time and or to accelerate performance of training module 246.

In this way, the test strip reader computer apparatus and test strip reader module may provide a high level of accuracy in reading test strip results using a machine learning transformer architecture, wherein images of test strips may have any orientation, and wherein the test strip reader module may require reduced training.

FIG. 1 is a network and device diagram illustrating an example of mobile device 105, test strip reader computer 200, and test strip reader computer datastore 300 and network 150, according to some embodiments.

In the example illustrated in FIG. 1, mobile device 105 may be a mobile computer device, such as a mobile phone, tablet, laptop computer, digital camera, and the like. Mobile device 105 may comprise imaging module 110; imaging module 110 may be used to capture digital images of, for example, test strips. Imaging module 110 may provide prompts and assistance to a user of mobile device 105, to facilitate use of the test strips, such as to ensure that sufficient time elapses following application of the test liquid to the test strip, to ensure that a suitable temperature is maintained for the test strip, to ensure that high quality images are taken by imaging module 110, to collect information regarding a test subject and or a test administrator (such as a party operating mobile device 105), and the like.

In the example illustrated in FIG. 1, mobile device 105 and imaging module 110 may be used by a user to capture image 115. Image 115 may comprise pixels, including red, green, blue, cyan, magenta, yellow, and black pixels. Image 115 is illustrated as comprising pixels of test strip 120, in addition to other pixels, such as a hand in a glove. In FIG. 1, orientation of image 115 is illustrated as not parallel with mobile device 105, neither with respect to boundaries of image 115 nor test strip 120. This is deliberate, as the disclosure herein is not sensitive to an orientation of input images, such as image 115, nor of a test strip therein.

As illustrated in the example in FIG. 1, test strip 120 may comprise a capillary bed in a frame; the frame may comprise windows. The user may apply a test liquid to one of the windows to initiate the test strip. The test liquid may flow through the capillary bed, across a reagent, and across at least one of a control zone and or a test or diagnostic zone. In the example illustrated in FIG. 1, a result of a diagnostic test may be read by interpreting whether a control line and or diagnostic line develop in the control zone and or the diagnostic zone.

Figure 2:
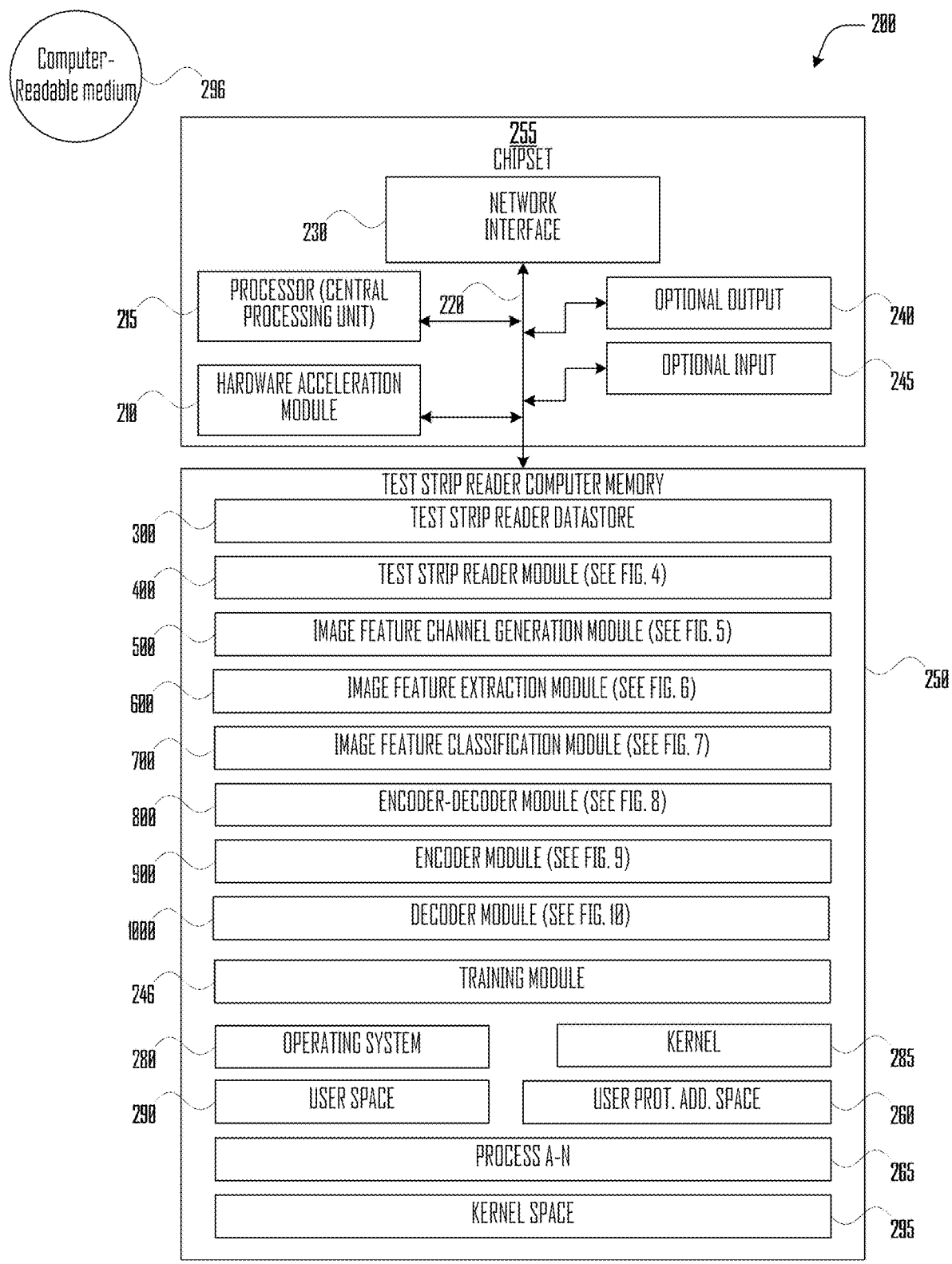
FIG. 2 is a functional block diagram illustrating an example of the transformer test strip reader computer device of FIG. 1, incorporated with teachings of the present disclosure, according to some embodiments.

Mobile device 105 illustrated in FIG. 1 may connect with network 150 and/or test strip reader computer 200, described further in relation to FIG. 2.

Test strip reader computer 200 is illustrated as connecting to test strip reader datastore 300. Test strip reader datastore 300 is described further, herein, though, generally, should be understood as a datastore used by test strip reader computer 200.

Test strip reader computer 200 may be mobile device 105 and or test strip reader computer 200 may be separate a server computer. Test strip reader computer 200 may serve a plurality of mobile devices 105.

Test strip reader computer 200 is illustrated as comprising modules, such as test strip reader module 400. In the examples illustrated herein, test strip reader module 400 may utilize or call image feature channel generation module 500, image feature processing module 600, and image feature classification module 700. One or more such modules may call additional modules, such as encoder-decoder module 800. Encoder-decoder module 800 may call additional modules, such as encoder module 900 and decoder module 1000.

Functions performed by test strip reader module 400 and called modules may comprise the following: obtain a digital image, call image feature channel generation module 500 to generate image feature channels based on the image and pass the generated image feature channels to image feature processing module 600.

Image feature processing module 600 may detect and extract pixels of a test strip and determine whether a test strip is present in the digital image by calling, for example, encoder-decoder module 800. Image feature processing module 600 may further determine whether a test strip is present in the digital image. Image feature processing module 600 may further detect and extract pixels of a test strip and output image feature channels comprising the test strip as well as pixels comprising the test strip by calling, for example, encoder-decoder module 800. The pixels identified as comprising the test strip may be made available to a human to confirm results of test strip reader module 400. Image feature processing module 600 may further call, for example, encoder-decoder module 800, and process image feature channels comprising the test strip and detect and output pixels of the diagnostic zone and image feature channels comprising the diagnostic zone. The pixels identified as comprising the diagnostic zone may be made available to a human to confirm results of test strip reader module 400. Image feature processing module 600 may further call, for example, encoder-decoder module 800, and process the image feature channels comprising the test strip and output pixels of the control zone and image feature channels comprising the control zone. The pixels identified as comprising the control zone may be made available to a human to confirm results of test strip reader module 400.

Functions performed by test strip reader module 400 and called modules may further comprise the following: image feature classification module 700. Image feature classification module 700 may receive image features, such as image feature channels comprising the diagnostic zone of the test strip and image feature channels comprising the control zone of the test strip. Image feature classification module 700 may further call encoder-decoder module 800 and classify result(s) of the test strip determined from the image feature channels comprising the diagnostic zone of the test strip and from the image feature channels comprising the control zone. The classification may comprise, for example, whether a positive or negative result was identified in one or more of the diagnostic zone and the control zone of the test strip.

Functions performed by test strip reader module 400 and called modules may further comprise transmission of one or more reports, wherein the report(s) comprise the classification results of the diagnostic zone and the control zone.

Thereby, test strip reader computer 200 and modules thereof such as test strip reader module 400 may determine a result of a test strip using a transformer based machine learning process. The transformer based machine learning process may operate in parallel on pixels of the input image and on image feature channels derives from such pixels. A data processing architecture of the transformer based machine learning process utilized by test strip reader computer 200 and test strip reader module 400 may not be recursive, such as when a test strip is read in a production environment (e.g. other than during training). The data processing architecture of the transformer based machine learning process utilized by test strip reader computer 200 and test strip reader module 400 may be more efficient, may be faster, may be easier to train, may require fewer programmers to implement, may be insensitive to rotation or skew of images, and may return reliable or more reliable results in comparison to legacy systems used to determine a result of a test strip.

Functions performed by test strip reader module 400 and called modules may be reorganized and still perform the functions outlined herein; e.g. one or more modules may be performed by one or more computer devices, such as across a network, such as network 150.

Network 150 may comprise computers, network connections among the computers, and software routines to enable communication between the computers over the network connections. Examples of network 150 comprise an Ethernet network, the Internet, and/or a wireless network, such as a GSM, TDMA, CDMA, EDGE, HSPA, LTE or other network provided by a wireless service provider. Connection to network 150 may be via a Wi-Fi connection. More than one network may be involved in a communication session between the illustrated devices. Connection to network 150 may require that the computers execute software routines which enable, for example, the seven layers of the OSI model of computer networking or equivalent in a wireless phone network.

FIG. 2 is a functional block diagram illustrating an example of test strip reader computer 200, incorporated with teachings of the present disclosure, according to some embodiments. Test strip reader computer 200 may comprise chipset 255. Chipset 255 may comprise processor 215, input/output (I/O) port(s) and peripheral devices, such as output 240 and input 245, and network interface 230, and computer device memory 250, all interconnected via bus 220. Network interface 230 may be utilized to form connections with network 150, with test strip reader datastore 300, or to form device-to-device connections with other computers.

Chipset 255 may include communication components and/or paths, e.g., buses 220, that couple processor 215 to peripheral devices, such as, for example, output 240 and input 245, which may be connected via I/O ports. Processor 215 may include one or more execution cores (CPUs). For example, chipset 255 may also include a peripheral controller hub (PCH) (not shown). In another example, chipset 255 may also include a sensors hub (not shown). Input 245 and output 240 may comprise, for example, user interface device(s) including a display, a touch-screen display, printer, keypad, keyboard, etc., sensor(s) including accelerometer, global positioning system (GPS), gyroscope, digital camera, etc., communication logic, wired and/or wireless, storage device(s) including hard disk drives, solid-state drives, removable storage media, etc. I/O ports for input 245 and output 240 may be configured to transmit and/or receive commands and/or data according to one or more communications protocols. For example, one or more of the I/O ports may comply and/or be compatible with a universal serial bus (USB) protocol, peripheral component interconnect (PCI) protocol (e.g., PCI express (PCIe)), or the like.

Hardware acceleration module 210 may provide hardware acceleration of various functions otherwise performed by test strip reader module 400, by modules which may be called by such module, and training module 240.

Hardware acceleration module may be provided by, for example, Integrated Performance Primitives software library by Intel Corporation, as may be executed by an Intel (or other compatible) chip, and which may implement, for example, a library of programming functions involved with real time computer vision and machine learning systems. Such a library includes, for example, OpenCV. OpenCV includes, for example, application areas including 2D and 3D feature toolkits, egomotion estimation, facial recognition, gesture recognition, human-computer interaction, mobile robotics, motion understanding, object identification, segmentation and recognition, stereopsis stereo vision (including depth perception from two cameras), structure from motion, motion tracking, and augmented reality. OpenCV also includes a statistical machine learning library including boosting, decision tree learning, gradient boosting trees, expectation-maximization algorithms, k-nearest neighbor algorithm, naïve Bayes classifier, artificial neural networks, random forest, and a support tensor machine.

Hardware acceleration module may be provided by, for example, NVIDIA® CUDA-X libraries, tools, and technologies built on NVIDIA CUDA® technologies. Such libraries may comprise, for example, math libraries, parallel algorithms, image and video libraries, communication libraries, deep learning libraries, and partner libraries. Math libraries may comprise, for example, a GPU-accelerated basic linear algebra (BLAS) library, a GPU-accelerated library for Fast Fourier Transforms, a GPU-accelerated standard mathematical function library, a GPU-accelerated random number generation (RNG), GPU-accelerated dense and sparse direct solvers, GPU-accelerated BLAS for sparse matrices, a GPU-accelerated tensor linear algebra library, and a GPU-accelerated linear solvers for simulations and implicit unstructured methods. Parallel algorithm libraries may comprise, for example a GPU-accelerated library of C++ parallel algorithms and data structures. Image and video libraries may comprise, for example, a GPU-accelerated library for JPEG decoding, GPU-accelerated image, video, and signal processing functions, a set of APIs, samples, and documentation for hardware accelerated video encode and decode on various operating systems, and a software developer kit which exposes hardware capability of NVIDIA TURING™ GPUs dedicated to computing relative motion of pixels between images. Communication libraries may comprise a standard for GPU memory, with extensions for improved performance on GPUs, an open-source library for fast multi-GPU, multi-node communications that maximize bandwidth while maintaining low latency. Deep learning libraries may comprise, for example, a GPU-accelerated library of primitives for deep neural networks, a deep learning inference optimizer and runtime for product deployment, a real-time streaming analytics toolkit for AI-based video understanding and multi-sensor processing, and an open source library for decoding and augmenting images and videos to accelerate deep learning applications. Partner libraries may comprise, for example, OpenCV, FFmpeg, ArrayFire, Magma, IMSL Fortan Numerical Library, Gunrock, Cholmod, Triton Ocean SDK, CUVIlib, and others.

In embodiments, hardware acceleration module 210 may be or comprise a programmed FPGA, i.e., a FPGA which gate arrays are configured with a bit stream to embody the logic of the hardware accelerated function (equivalent to the logic provided by the executable instructions of a software embodiment of the function). In embodiments, hardware acceleration module 210 may also or alternatively include components of or supporting computer device memory 250.

Computer device memory 250 may comprise a random access memory ("RAM"), a read only memory ("ROM"), and a permanent mass storage device, such as a disk drive or SDRAM (synchronous dynamic random-access memory). Computer device memory 250 may store program code for modules and/or software routines, such as, for example, hardware acceleration module 210, test strip reader datastore 300 (illustrated and discussed further in relation to FIG. 3), test strip reader module 400 (illustrated and discussed further in relation to FIG. 4), image feature channel generation module 500 (illustrated and discussed further in relation to FIG. 5), image feature processing module 600 (illustrated and discussed further in relation to FIG. 6), image feature classification module 700 (illustrated and discussed further in relation to FIG. 7), encoder-decoder module 800 (illustrated and discussed further in relation to FIG. 8), encoder module 900 (illustrated and discussed further in relation to FIG. 9), decoder module 1000, (illustrated and discussed further in relation to FIG. 10), and training module 246.

Computer device memory 250 may also store operating system 280. These software components may be loaded from a non-transient computer readable storage medium 296 into computer device memory 250 using a drive mechanism associated with a non-transient computer readable storage medium 296, such as a floppy disc, tape, DVD/CD-ROM drive, memory card, or other like storage medium. In some embodiments, software components may also or instead be loaded via a mechanism other than a drive mechanism and computer readable storage medium 296 (e.g., via network interface 230).

Figure 3:
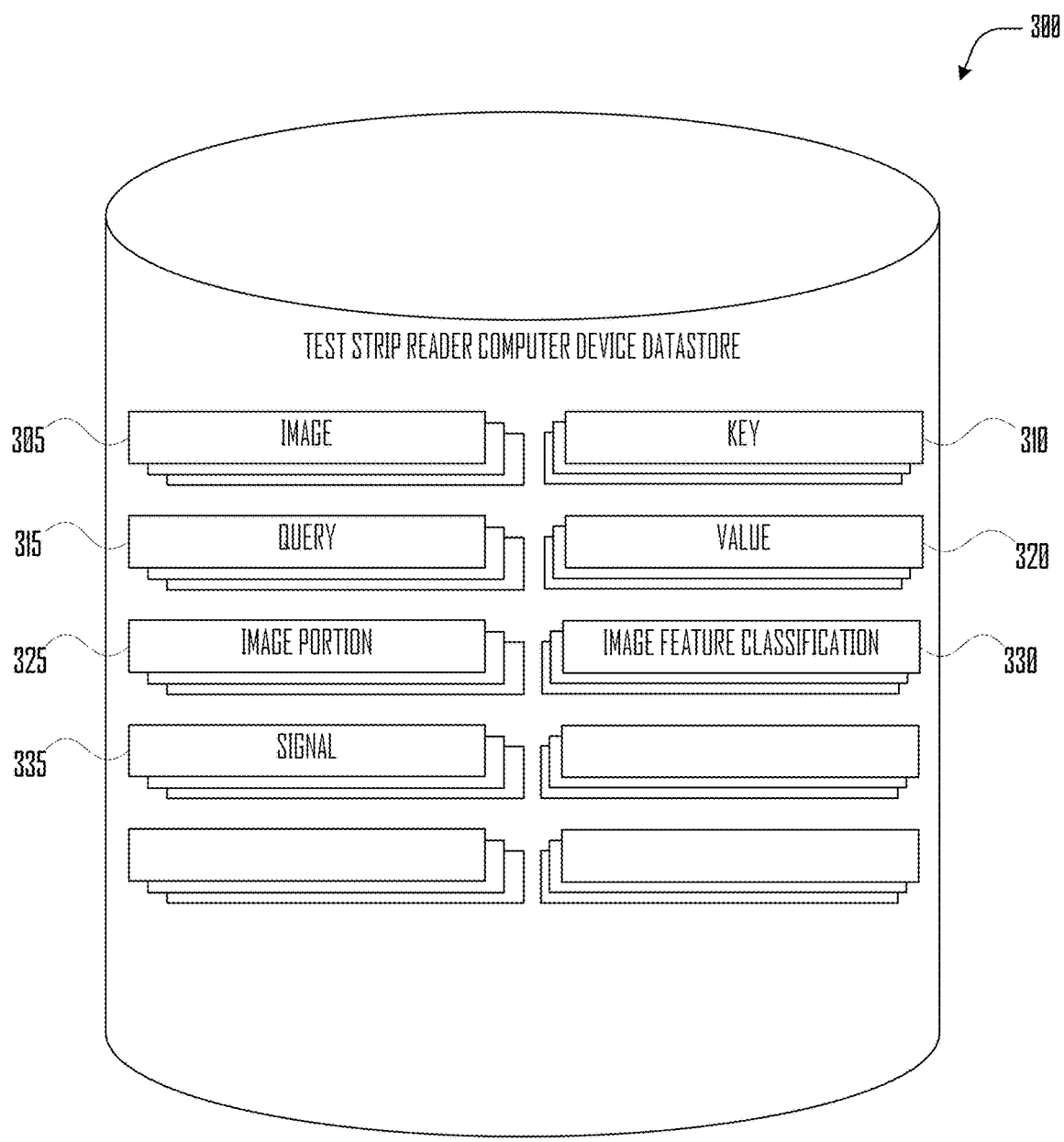
FIG. 3 is a functional block diagram illustrating an example of a transformer test strip reader computer device datastore incorporated with teachings of the present disclosure, consistent with embodiments of the present disclosure.

Computer device memory 250 is also illustrated as comprising kernel 285, kernel space 295, user space 290, user protected address space 260, and test strip reader datastore 300 (illustrated and discussed further in relation to FIG. 3).

Computer device memory 250 may store one or more process 265 (i.e., executing software application(s)). Process 265 may be stored in user space 290. Process 265 may include one or more other process 265*a* to 265*n*. One or more process 265 may execute generally in parallel, i.e., as a plurality of processes and/or a plurality of threads.

Computer device memory 250 is further illustrated as storing operating system 280 and/or kernel 285. The operating system 280 and/or kernel 285 may be stored in kernel space 295. In some embodiments, operating system 280 may include kernel 285. Operating system 280 and/or kernel 285 may attempt to protect kernel space 295 and prevent access by certain of process 265*a* . . . 265*n*.

Kernel 285 may be configured to provide an interface between user processes and circuitry associated with test strip reader computer 200. In other words, kernel 285 may be configured to manage access to processor 215, chipset 255, I/O ports and peripheral devices by process 265. Kernel 285 may include one or more drivers configured to manage and/or communicate with elements of test strip reader computer 200 (i.e., processor 215, chipset 255, I/O ports and peripheral devices).

Test strip reader computer 200 may also comprise or communicate via bus 220 and/or network interface 230 with test strip reader datastore 300, illustrated and discussed further in relation to FIG. 3. In various embodiments, bus 220 may comprise a high speed serial bus, and network interface 230 may be coupled to a storage area network ("SAN"), a high speed wired or wireless network, and/or via other suitable communication technology. Test strip reader computer 200 may, in some embodiments, include many more components than as illustrated. However, it is not necessary that all components be shown in order to disclose an illustrative embodiment.

FIG. 3 is a functional block diagram of test strip reader datastore 300 illustrated in the computer device of FIG. 2, according to some embodiments. The components of test strip reader datastore 300 may include data groups used by modules and/or routines, e.g., image 305, key 310, query 315, value 320, image portion 325, and image feature classification 330 (to be described more fully below). Embodiments may include additional data groups. The data groups used by modules or routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, references to other database entries, joins, conditional logic, tests, and similar. The components of computer datastore 300 are discussed further herein in the discussion of other of the Figures.

Figure 4:
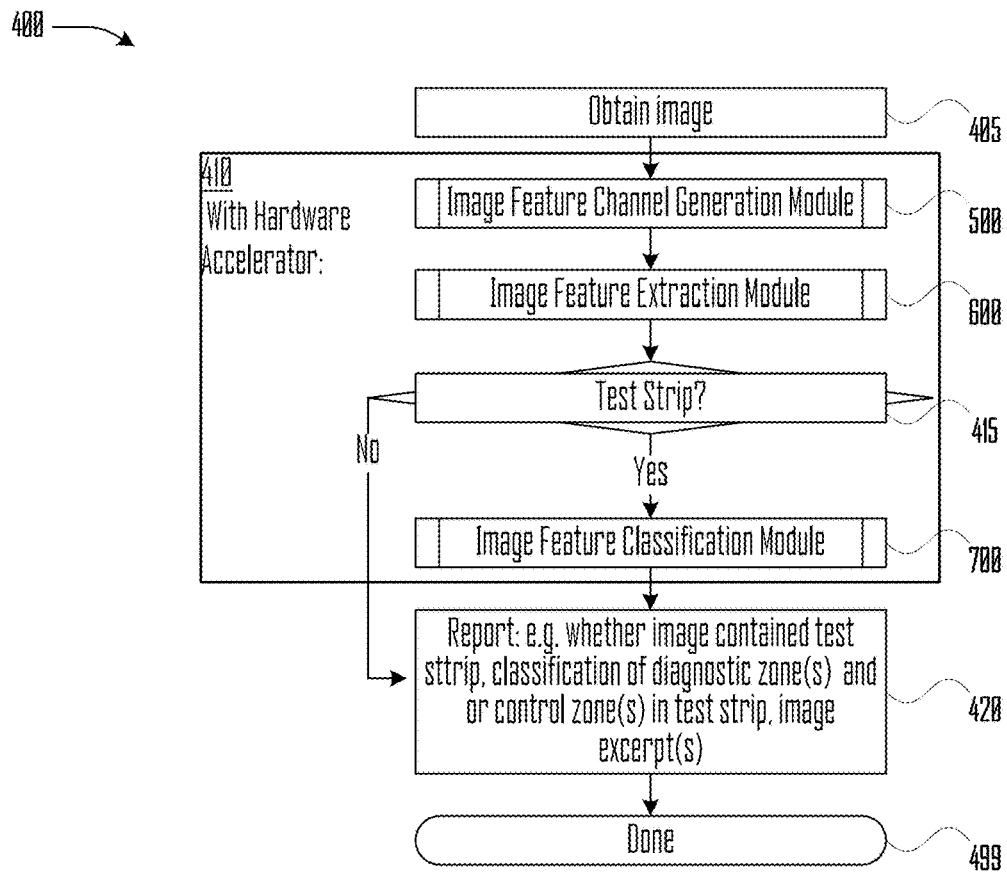
FIG. 4 is a flow diagram illustrating an example of a method performed by a test strip reader module, according to some embodiments.

FIG. 4 is a flow diagram illustrating an example of test strip reader module 400, according to an embodiment. Test strip reader module 400 may be performed by test strip reader computer device(s), such as test strip reader computer 200, according to some embodiments. These modules may be performed by or with assistance of a hardware accelerator, such as hardware acceleration module 210.

At block 405, test strip reader module 400 may obtain an image, such as a digital image captured by mobile device 105 and imaging module 110. The obtained image may be stored as, for example, one or more image 305 records. The obtained image may be referred to herein as "image 305".

At block 410, test strip reader module 400 may call or perform blocks 500, 600, 415, and 700 using, for example, hardware acceleration module 210.

At block 500, test strip reader module 400 may call or trigger execution of, for example, image feature channel generation module 500. Image feature channel generation module 500 may generate image feature channels from or based on image 305. Image feature channels may comprise some or all of the following: image 305, portions of image 305, patches within image 305, wherein patches may comprise blocks of pixels within image 305, encodings of patches, wherein an encoding of a patch may comprise image features, wherein an image feature may comprise a result of a filter or query processed with respect to or on a patch, and or position information for patches, for encodings of patches, and or for image features.

Image feature channel generation module 500 may output multiple image feature channels as tensors, such as 2048 image feature channels. Different image feature channels generated by image feature channel generation module 500 may identify or be targeted at different low level image features, though the low level image features emerge from training of a neural network and may or may not overlap with categories applied by humans, even if the training was labeled with or oriented toward a human category. For example, an image feature channel may be produced, wherein an underlying filter used by a neural network to produce the image feature channel was obtained by training the neural network to optimize a loss function so that the image feature channel corresponds with objects identified by humans. Objects in an "object" image feature channel may therefore overlap with objects identified by humans, though the image feature channel may identify many more objects than humans do, it may not identify some "human" objects as "objects", and it may not be realistic or even desirable to determine how or even whether the neural network really is identifying "objects". A more functional result is sought, wherein the image feature channel is productive toward a result, such as a recognition task, regardless of what a neural network may be doing, internally, in its hidden states. Similarly, an image feature channel may be described as identify edges, because this is how humans categorized the training set, though it may require significant analysis to determine whether the image feature channel actually identifies "edges" or merely some other feature which sufficiently overlaps with "edges" that we give it this categorization. Because many of the modules herein use neural networks, wherein the neural networks comprise hidden states, the categories applied to output of these machine processes may be approximate and or for the sake of convenience.

Generally, during training, a large or even random set of filters may be used, wherein training may determine that some of the training filters do not meaningfully improve results and may not be used during production (non-training) use.

Generally, if more image feature channels are utilized in a recognition process, accuracy of a desired recognition result may improve, though computer processing demands may also increase. For this reason, an implementation of modules disclosed herein may improve when the implementation is performed on a server computer with compute resources to process many image feature channels. Mobile computers may also implement these modules, though may have reduced computing resources, may not be able to process as many image feature channels, and may produce results which are not as accurate or reliable.

The low level image feature channels output by image feature channel generation module 500 may be processed by subsequent modules, such as image feature processing module 600, to output further image feature channels which are more narrowly addressed to specific human-relatable categories, such as to test strips, control zones, and diagnostic zones.

At block 500, test strip reader module 400 may call or trigger execution of, for example, image feature processing module 600. Image feature processing module 600 may, for example, determine if a test strip is present in image 305 and, when affirmative, may also identify pixels corresponding to the test strip in image 305 and may also output image feature channels corresponding to the identified test strip. The pixels corresponding to the test strip may be output to a human and recorded in one or more image portion 325 records. Image feature channels corresponding to the identified test strip may be output to subsequent modules within image feature processing module 600, so that additional and narrower image feature pixels and image feature channels may be obtained and further analyzed. For example, pixels identified as a test strip and image feature channels corresponding to the test strip may be passed to subsequent or other modules within image feature processing module 600, wherein the other modules identify pixels corresponding to a control zone and may also output image feature channels corresponding to the identified control zone. The pixels corresponding to the control zone may be recorded in one or more image portion 325 records. The image feature channels corresponding to the identified control zone may be output to subsequent modules, such as to image feature classification module 700. Image feature classification module 700 may classify a result within the control zone as a signal, which may be stored as one or more signal 335 records. For example, pixels identified as a test strip and image feature channels corresponding to the test strip may be passed to subsequent or other modules within image feature processing module 600, wherein the other modules identify pixels corresponding to a diagnostic zone and may also output image feature channels corresponding to the identified diagnostic zone. The pixels corresponding to the diagnostic zone may be recorded in one or more image portion 325 records. The image feature channels corresponding to the identified diagnostic zone may be output to subsequent modules, such as to image feature classification module 700. Image feature classification module 700 may classify a result within the diagnostic zone as signal 335.

At decision block 415, test strip reader module 400 may determine whether image 305 comprises a test strip. This determination may be based on a result of, for example, image feature processing module 600 and whether image feature processing module 600 identified the presence of a test strip in image 305.

If affirmative or equivalent at decision block 415, at block 700 test strip reader module 400 may call or trigger execution of, for example, image feature classification module 700. As discussed, image feature classification module 700 may classify features within image 305, such as, for example, whether a feature identified as a control zone contains a signal indicative of a positive or negative response by the control zone and or whether a feature identified as a diagnostic zone contains a signal indicative of a positive or negative response between the reagent and the analyte.

Following block 700 or following a negative or equivalent decision at decision block 415, at block 420, test strip reader module 400 may provide a report regarding results of image 305. The report may be provided to, for example, a test subject, a user of test strip reader computer 200 and or of test strip reader module 400, a medical provider, a public health service provider, to an individual or process authorized to receive this information, or the like. The report may comprise image excerpts or maps to image excerpts corresponding to control zone pixels and diagnostic zone pixels, such as one or more image portion 325 records.

At block 499, test strip reader module 400 may conclude and or return to a module and or another process which may have called it.

Figure 5:
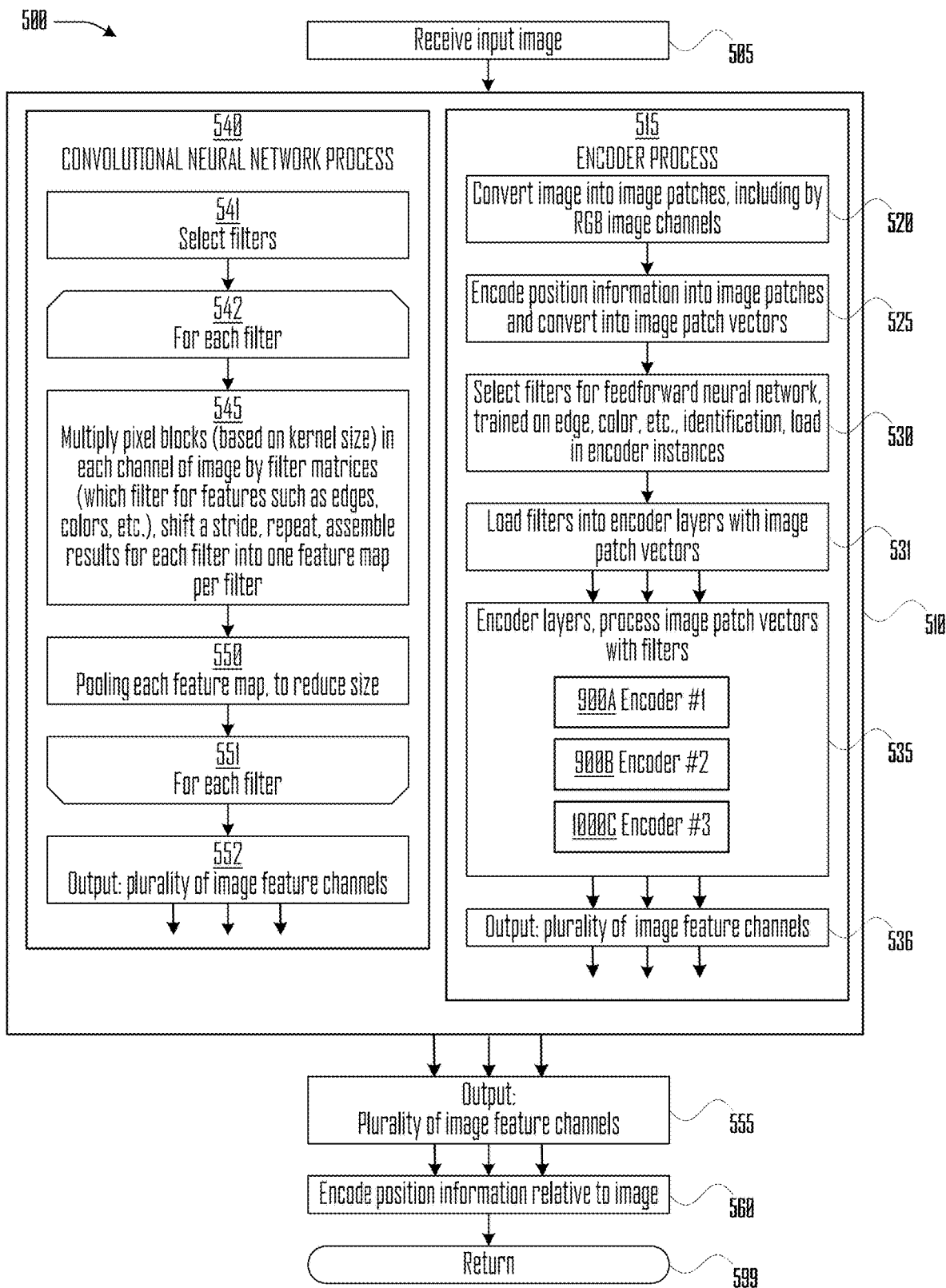
FIG. 5 is a flow diagram illustrating an example of a method performed by an image feature channel generation module, according to some embodiments.

FIG. 5 is a flow diagram illustrating an example of a method performed by image feature channel generation module 500, according to an embodiment. Image feature channel generation module 500 may be performed by test strip reader computer device(s), such as test strip reader computer 200, according to some embodiments. These modules may be performed by or with assistance of a hardware accelerator, such as hardware acceleration module 210.

At block 505, image feature channel generation module 500 may receive an input image, such as image 305.

In block 510, image feature channel generation module 500 may convert the image into a plurality of tensors, because, for example, subsequent modules process tensors. The tensors also encode the presence of low-level features, such as the presence of an edge, of a color, etc. The tensors also encode position information, so that low-level feature information is retained along with position. Output of block 510 are a plurality of image feature channels, each of which is a tensor which encodes low-level feature information (such as the presence of an edge, of a color, etc.).

Conversion of the images into tensors comprising feature information can be performed in a variety of ways, two examples of which are illustrated.

In block 515, an example of preparation of a plurality of image feature channels is illustrated using an encoder process.

Within block 515, in block 520, image feature channel generation module 500 may convert image 305 into image patches, or successive blocks of pixels; this may be done for each layer or channel of red-green-blue (etc.) pixels in image 305.

Within block 515, at block 525, image feature channel generation module 500 may encode position information into the image patches, such as to allow the image patches to be mapped back to image 305, and may convert the image patches and position information into a plurality of image patch tensors.

Within block 515, at block 530, image feature channel generation module 500 may select filters to be used by a plurality of feedforward neural networks to produce image feature channels. The filters may be obtained from, for example, key 310, query 315, and value 320 records. The filters may have been obtained by training the feedforward neural networks to identify, for example, low-level features edges, colors, shapes and the like. There may be a set of filters for various low-level feature. There may be on the order of, for example, 2048 filters, each to produce a different image feature channel. Each of the selected filters may be loaded into an encoder layer instance.

Within block 515, at block 531, image feature channel generation module 500 may load the filters of block 530 into a plurality of encoder layers along with the image patch tensors. Three arrows are shown exiting block 531; there may be, for example 2048 filters. At block 535, image feature channel generation module 500 may call encoder module 900 to generate the encoder layers for the filters, represented in block 900A for a first layer, block 900B for a second layer, and block 900C for a third layer, etc. More or fewer layers may be used.

The plurality of encoder layers for the filters are loaded with the filters selected in block 530. The first encoder layer, 900A, receives as input the position-encoded image patch tensors of block 525 and applies the filters of block 530 and 531. Inputs to the first encoder layer may be processed in parallel. Output of the first encoder layer is fed to the second layer, etc., until the final layer is reached. The final layer outputs, in block 536, a plurality of an image feature channels, such as one image feature channel for each filter.

In an alternative example, within block 540, image feature channel generation module 500 may prepare image feature channels using a convolutional neural network process.

Within block 540, at block 541, image feature channel generation module 500 may select filters to be used to generate image feature channels. As noted, there may be, for example, 2048 filters.

Within block 540, at block 542, image feature channel generation module 500 iterates over a then-current filter. Block 542 to block 551 may be performed in parallel, across multiple instances.

Within block 540, at block 545, within image patches in each RGB channel, image feature channel generation module 500 may multiply image patches in an RGB channel by filter matrices. Each filter matrices filters for a low-level feature, such as objects, an edge or edge type, colors, etc. Output of the multiplication is a value for a stride position.

The stride position is shifted by a stride length. Values for all stride positions for a filter across image 305 form a matrix.

Within block 540, at block 550, pooling across a matrix may be performed to reduce the volume of the matrices. Pooling may be max-pooling, average-pooling, or the like.

Within block 540, at closing loop block 551, image feature channel generation module 500 may return to opening loop block 542 to iterate over a next filter, if any. As noted, block 542 to block 551 may be performed in parallel, across multiple instances.

At block 552, 536, and or 555, image feature channel generation module 500 may output a plurality of image feature channels, wherein each image feature channel comprises a tensor, encoded with low-level image features from a filter.

At block 560, the image feature channels may be encoded with position information for or relative to the image.

At done or return block 599, image feature channel generation module 500 may conclude or return to a module or another process which may have called it.

Figure 6:
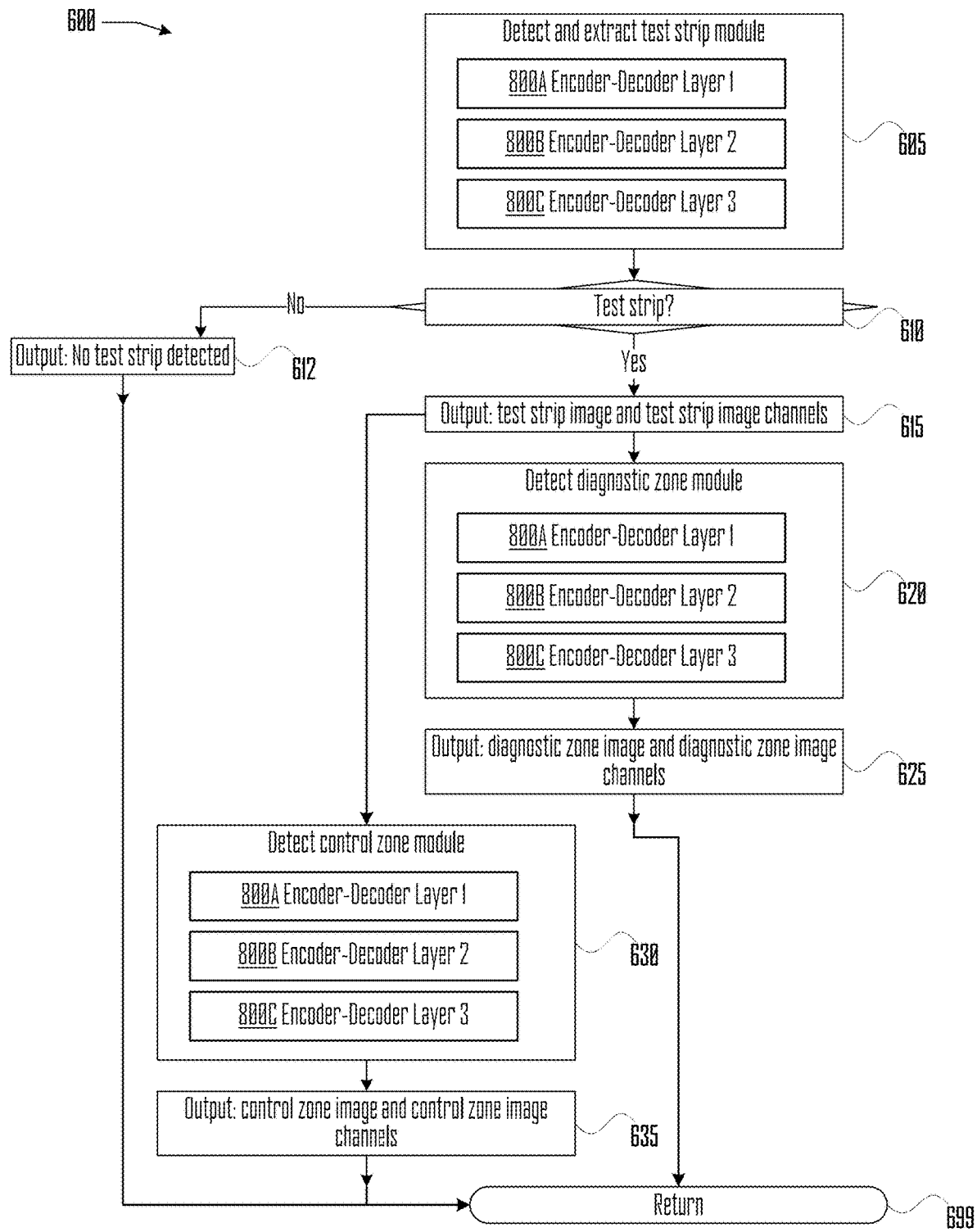
FIG. 6 is a flow diagram illustrating an example of a method performed by an image feature processing module, according to some embodiments.

FIG. 6 is a flow diagram illustrating an example of a method performed by image feature processing module 600, according to an embodiment. Image feature processing module 600 may be performed by test strip reader computer device(s), such as test strip reader computer 200, according to some embodiments. These modules may be performed by or with assistance of a hardware accelerator, such as hardware acceleration module 210.

At block 605, image feature processing module 600 may perform detect and extract test strip module to detect and extract pixels corresponding to a test strip from image 305 and to output image feature channels for a detected test strip. Detect and extract test strip module may be performed by creating a plurality of encoder-decoder layers to process image feature channels output by image feature channel generation module 500. Detect and extract test strip module may load the encoder-decoder layers with filters, e.g. key 310, query 315, and value 320, determined when feedforward neural networks were trained on a recognition task of identifying test strips. Output of the first layer is fed to the next layer, etc., until the layers are completed. The plurality of encoder-decoder layers may be created by calling encoder-decoder module 800, for each layer, as illustrated by encoder-decoder layer 1 800A, encoder-decoder layer 2 800B, encoder-decoder layer 3 800C, etc. Fewer or greater number of encoder-decoder layers may be used. Encoder-decoder module 800 is illustrated and discussed further in relation to FIG. 8.

At decision block 610, image feature processing module 600 may determine whether a test strip was identified at block 605.

If affirmative or equivalent at decision block 610, at block 615 image feature processing module 600 may output a test strip image as an image portion 325 record. Image feature processing module 600 may further output test strip image feature channels, such as to image feature classification module 700.

If negative or equivalent at decision block 610, at block 612 image feature processing module 600 may output a signal that no test strip was detected. This signal may be used by, for example, test strip reader module 400, for example at decision block 415.

At block 620, image feature processing module 600 may perform detect and extract diagnostic zone module to detect and extract pixels corresponding to a diagnostic zone from test strip image feature channels of block 615 and to output image feature channels for a detected diagnostic zone.

Detect and extract diagnostic zone module may be performed by creating a plurality of encoder-decoder layers to process test strip image feature channels of block 615. Detect and extract diagnostic zone module may load the encoder-decoder layers with filters, e.g. key 310, query 315, and value 320, determined when feedforward neural networks were trained on this recognition task. Output of the first layer is fed to the next layer, etc., until the layers are completed. The plurality of encoder-decoder layers may be created by calling encoder-decoder module 800, for each layer, as illustrated by encoder-decoder layer 1 800A, encoder-decoder layer 2 800B, encoder-decoder layer 3 800C, etc. Fewer or greater number of encoder-decoder layers may be used. Encoder-decoder module 800 is illustrated and discussed further in relation to FIG. 8.

Not illustrated, image feature processing module 600 may determine whether a diagnostic zone was identified at block 620.

If affirmative or equivalent for a diagnostic zone, at block 625 image feature processing module 600 may output a diagnostic zone image as an image portion 325 record. Image feature processing module 600 may further output diagnostic zone image feature channels, such as to image feature classification module 700.

At block 630, image feature processing module 600 may perform detect and extract control zone module to detect and extract pixels corresponding to a control zone from test strip image feature channels and to output image feature channels for a detected control zone. Detect and extract control zone module may be performed by creating a plurality of encoder-decoder layers to process test strip image feature channels of block 615. Detect and extract diagnostic zone module may load the encoder-decoder layers with filters, e.g. key 310, query 315, and value 320, determined when feedforward neural networks were trained on this recognition task. Output of the first layer is fed to the next layer, etc., until the layers are completed. The plurality of encoder-decoder layers may be created by calling encoder-decoder module 800, for each layer, as illustrated by encoder-decoder layer 1 800A, encoder-decoder layer 2 800B, encoder-decoder layer 3 800C, etc. Fewer or greater number of encoder-decoder layers may be used. Encoder-decoder module 800 is illustrated and discussed further in relation to FIG. 8.

Not illustrated, image feature processing module 600 may determine whether a control zone was identified at block 630.

If affirmative or equivalent for a control zone, at block 635 image feature processing module 600 may output a control zone image as an image portion 325 record. Image feature processing module 600 may further output control zone image feature channels.

At done or return block 699, image feature processing module 600 may conclude and or return to a module and or another process which may have called it.

Figure 7:
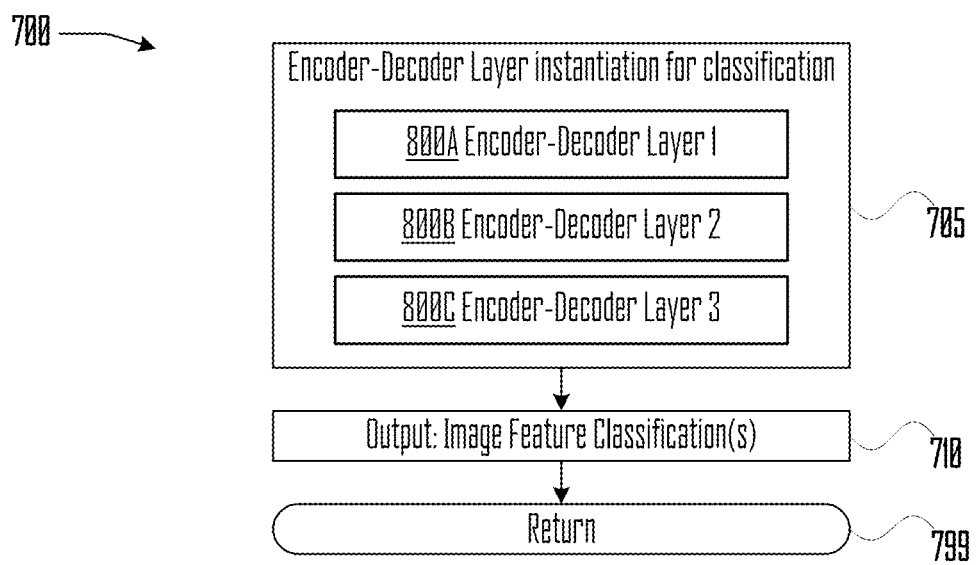
FIG. 7 is a flow diagram illustrating an example of a method performed by an image feature classification module, according to some embodiments.

FIG. 7 is a flow diagram illustrating an example of a method performed by image feature classification module 700, according to an embodiment. Image feature classification module 700 may be performed by test strip reader computer device(s), such as test strip reader computer 200, according to some embodiments. These modules may be performed by or with assistance of a hardware accelerator, such as hardware acceleration module 210.

At block 705, image feature classification module 700 may instantiate a plurality of encoder-decoder layers to classify image features, such as from diagnostic zone image feature channels of block 625 and or control zone image feature channels of block 635. Image feature classification module 700 may load the encoder-decoder layers with filters, e.g. key 310, query 315, and value 320, determined when feedforward neural networks were trained on these recognition tasks. Output of the first layer is fed to the next layer, etc., until the layers are completed. The plurality of encoder-decoder layers may be created by calling encoder-decoder module 800, for each layer, as illustrated by encoder-decoder layer 1 800A, encoder-decoder layer 2 800B, encoder-decoder layer 3 800C, etc. Fewer or greater number of encoder-decoder layers may be used. Encoder-decoder module 800 is illustrated and discussed further in relation to FIG. 8.

At block 710 image feature classification module 700 may output a classification of the control zone image feature channels and a classification of the diagnostic zone image feature channels. For example, a classification of the control zone image feature channels may comprise whether a signal is detected in the control zone, such as a color, a shape, or the like, wherein the signal indicates that the test strip functioned as expected, e.g. that it received test liquid and or that analyte in the test liquid combined with reagent and or that an expected reaction between the analyte and reagent took place. For example, a classification of the diagnostic zone image feature channels may comprise whether a signal is detected in the diagnostic zone, such as a color, a shape, or the like, wherein the signal indicates a qualitative (e.g. positive or negative) or quantitative result between analyte and reagent. Return of classification of diagnostic image feature channels may depend on whether classification of the control zone indicated expected functioning of the test strip; e.g. if classification of the control zone did not indicate expected functioning of the test strip, classification of the diagnostic zone may not be returned or it may be returned with a flag to indicate improper function of the test strip.

At done or return block 799, image feature classification module 700 may conclude and or return to a module and or another process which may have called it.

Figure 8:
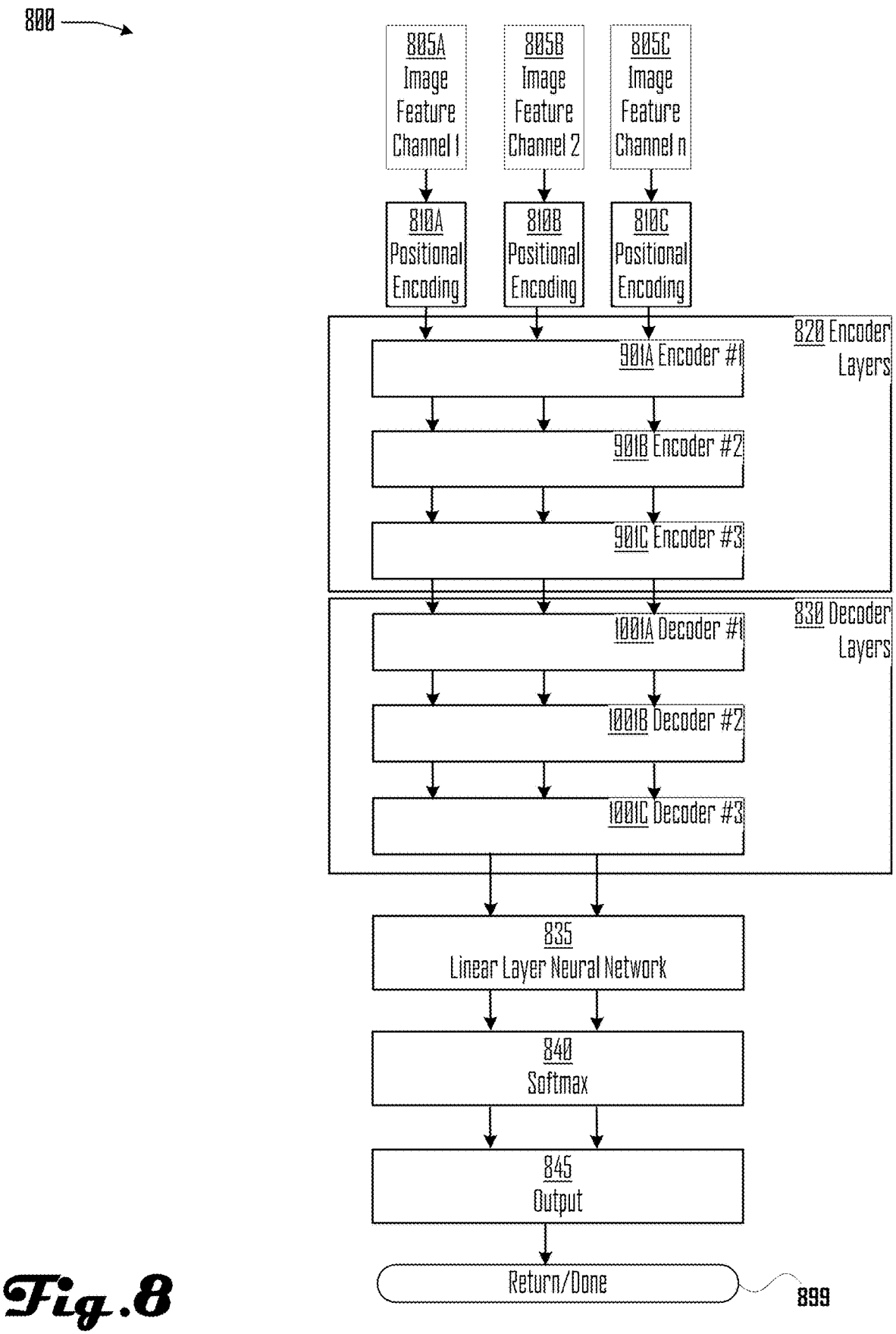
FIG. 8 is a flow diagram illustrating a first example of a method performed by a transformer encoder-decoder module, according to some embodiments.

FIG. 8 is a flow diagram illustrating an example of a method performed by encoder-decoder module 800, according to an embodiment. Encoder-decoder module 800 may be performed by test strip reader computer device(s), such as test strip reader computer 200, according to some embodiments. These modules may be performed by or with assistance of a hardware accelerator, such as hardware acceleration module 210.

In encoder-decoder module 800, blocks 805A, 805B, 805C, etc., each represent one of the following: an input image feature channel from, e.g., block 555, an input diagnostic zone channel from, e.g., block 625; or an input control zone channel from, e.g. block 635.

In encoder-decoder module 800, blocks 810A, 810B, 810C, etc., each represent encoding position information into input channels, relative to a relevant image 305 or image portion 325 corresponding the input image feature channel. This may be performed so that input image channels contain position information relative to a then-current image 305 or image portion 325; for example, when in block 605, detect and extract test strip module performs encoder-decoder layer1-layerN, to identify a test strip in image feature channels of image 115, from an image 305 record, the image feature channels of image 115 require position information to allow a test strip identified in them to be mapped back to image 305; for example, when in block 620, detect and extract test strip module performs encoder-decoder layer1-layerN, to identify a diagnostic zone in test strip image feature channels from block 605 and to extract the corresponding pixels as a test strip image portion 325 record, the test strip image feature channels require position information to allow the diagnostic zone to be identified in them to be mapped back to pixels of the test strip image portion 325 and to image 305; and for example, when in block 630, detect and extract test strip module performs encoder-decoder layer1-layerN, to identify a control zone in test strip image feature channels from block 605 and to extract the corresponding pixels as a control zone image portion 325 record, the test strip image feature channels require position information to allow the control zone to be identified in them to be mapped back to pixels of the test strip image portion 325 and to image 305.

In block 820, encoder-decoder module 800 instantiates a plurality of encoder layers, represented by block 901A for a first layer, block 901B for a second layer, block 901C, etc., for a third and or subsequent layer. A greater or lesser number of layers may be used. Instantiation of encoder layers may be performed by, for example, calling encoder module 900. In overview, each input channel in each encoder layer is processed by a multi-head attention layer, also referred to as "self attention". In the example illustrated herein, the multi-head attention layer considers information across the plurality of input channel tensors, weighting the importance of each of the input channel tensors on other of the input channel tensors. Output from the multi-head attention are a plurality of channel tensors. These are added and normalized, in conjunction with the original input channel tensors, and then separately output to a plurality of feedforward neural network layers. The feedforward neural network layers have been loaded with filters, e.g. key 310, query 315, and value 320 records. The filters are established during training of the feedforward neural networks. Keys correspond to items of interest in an input channel; queries correspond to how to pull an item of interest from the input channel; values represent the weighting of the item of interest. A feedforward neural network layer processes each input channel tensor and produces an output. The output from the feedforward neural network layers is combined with the output from the additional and normalization step and is added and normalized, producing another set of channel tensors which are output to and processed by a plurality of decoder layers.

At block 830, encoder-decoder module 800 instantiates a plurality of decoder layers, represented by block 1001A for a first layer, block 1001B for a second layer, block 1001C, etc., for a third and or subsequent layer. A greater or lesser number of layers may be used. Instantiation of decoder layers may be performed by, for example, calling decoder module 1000. In overview, each input channel in each decoder layer is processed by a multi-head attention layer, also referred to as "self attention". In the example illustrated herein, the multi-head attention layer considers information across the plurality of input channel tensors, weighting the importance of each of the input channel tensors on other of the input channel tensors. Output from the multi-head attention are a plurality of modified channel tensors. These are added and normalized, in conjunction with the original input channel tensors, and then separately output to an encoder-decoder multi-head attention layer. Output from the encoder-decoder multi-head attention layer are a plurality of further modified channel tensors. These are added and normalized, in conjunction with the original input channel tensors, and then separately output to a plurality of feedforward neural network layers. The feedforward neural network layers have been loaded with filters, e.g. key 310, query 315, and value 320 records. The filters are established during training of the feedforward neural networks. Keys correspond to items of interest in an input channel; queries correspond to how to pull an item of interest from the input channel; values represent the weighting of the item of interest. A feedforward neural network layer processes each input channel tensor and produces an output. The output from the feedforward neural network layers is combined with the output from the additional and normalization step and is added and normalized, producing a tensor of floats.

Output of block 830 may comprise, for example, a bounding box for an image portion 325, a signal 335 classification, and or an image feature channel.

At block 835, vector or tensor of floats output from the decoder layers are processed by linear layer neural network. The linear layer neural network is a fully connected neural network that projects the vector or tensor of floats produced by the stack of decoders into a larger vector or tensor, referred to as a logits vector or tensor. The logits vector or tensor is a score regarding how correlated the logits vector or tensor is with the "output vocabulary" of trained results; e.g. whether an input pixel is part of a test strip, part of a control zone, part of a diagnostic zone, a classification of a control zone, a classification of a diagnostic zone, etc.

At block 840, a softmax or equivalent layer converts the scores into positive probabilities which all add up to one. Entry(ies) in the output vocabulary with highest probability is/are chosen. This step may result in a polynomial increase in complexity and computational time for increase in size of the output vocabulary; in embodiments, approaches may be taken, for example, based on assumptions or decrease in accuracy, which result in linear increase complexity and computational time.

At block 845, the highest probability in the output vocabulary is output as the result. Depending on the filters loaded into the encoders and the decoders and on the input channels, the output may be an identification of pixels from image 305 which correspond to a trained image (e.g. to a test strip, to a control zone, to a diagnostic zone) and or to a result (e.g. a control zone result or a diagnostic zone result).

At done or return block 899, encoder-decoder module 800 may conclude and or return to a module and or another process which may have called it.

Figure 9:
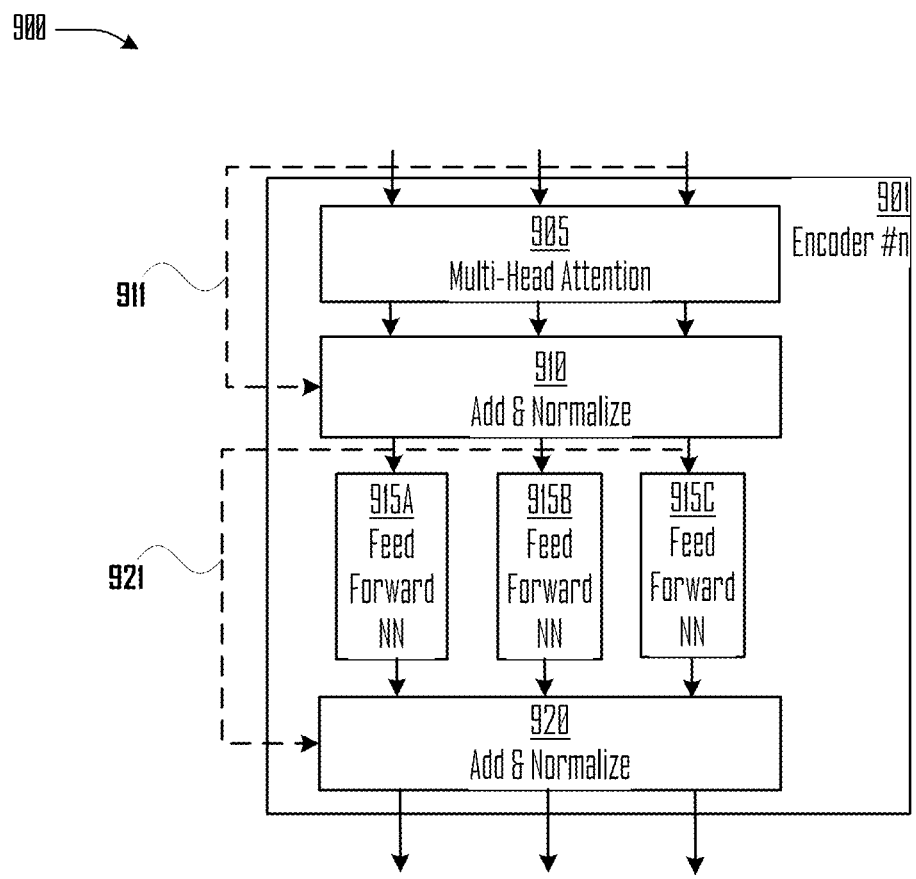
FIG. 9 is a flow diagram illustrating an example of a method performed by an encoder module, according to some embodiments.

FIG. 9 is a flow diagram illustrating an example of a method performed by encoder module 900, according to an embodiment. Encoder module 900 may be performed by test strip reader computer device(s), such as test strip reader computer 200, according to some embodiments. These modules may be performed by or with assistance of a hardware accelerator, such as hardware acceleration module 210.

Encoder layers created by encoder module 900 are identical, though do not necessarily share weights.

Encoder module 900 receives input tensors, such as image feature channels, position-encoded image channel tensors, or the output of a previous encoder layer. The input tensors flow into one or more multi-head attention layers 905, a.k.a. "self-attention". The multi-head attention layer(s) allows the encoder to determine how a first input tensor is affected by other input tensors. For example, a pixel, line, or other structure identified in a first input tensor may have a first meaning if it is next to another pixel, line, or other structure identified in another input tensor and a second meaning if it is not. There may be multiple attention heads, such as eight, in the multi-head attention layer for each input image channel.

In each attention head in the multi-head attention layer, each input tensor is multiplied by a query 315 matrix, a key 310 matrix, and a value 320 matrix (also referred to herein as "weights") to produce a query score, q1, a key score, k1, and a value score, v1, for the input tensor, 1. These scores, may, in embodiments, have smaller dimensions than the input tensor. The dot-product (matmul) is taken of the query score for the current input tensor, q1, and the key score for each of the input tensors, k1, k2, k3, to determine a set of attention scores for the current input tensor relative to each of the other input tensors, input to the multi-head attention layer. The attention scores are then divided by the square root of the dimension of the key tensor and passed through a softmax operation to normalize the scores so that they are all positive and add up to one, yielding a set of softmax scores for each of the plurality of input tensors relative to the current input tensor, softmax1, softmax2, softmax3. The value tensor of the current attention score, v1, is multiplied by the softmax scores for each of the plurality of input tensors.

Because there are a plurality of attention heads, such as eight, and because each feedforward neural network is expecting only one matrix, the products of the last step for each attention head for an input tensor are concatenated and multiplied by an additional weights matrix that was trained jointly with the model. This produces a single matrix for each input tensor.

The result of this allows the attention head to focus on (not reduce by much) other input tensors which are relevant to the current input tensor and drown out or significantly reduce other input tensors which are irrelevant to the current input tensor.

Output from multi-head attention block 905 is added to a residual of the input tensor, indicated by dotted line 911, and normalized in block 910

The weighted and normalized tensors are then added and sent to a plurality of feedforward neural networks, 915A, 915B, and 915C, etc, with a set of weights trained jointly with the model.

The result thereof is then added to a residual of the output of block 910 and normalized in block 920, producing a set of output tensors. The output tensors may flow to a next encoder in a series or, if the current encoder is a last encoder, to a decoder.

Figure 10:
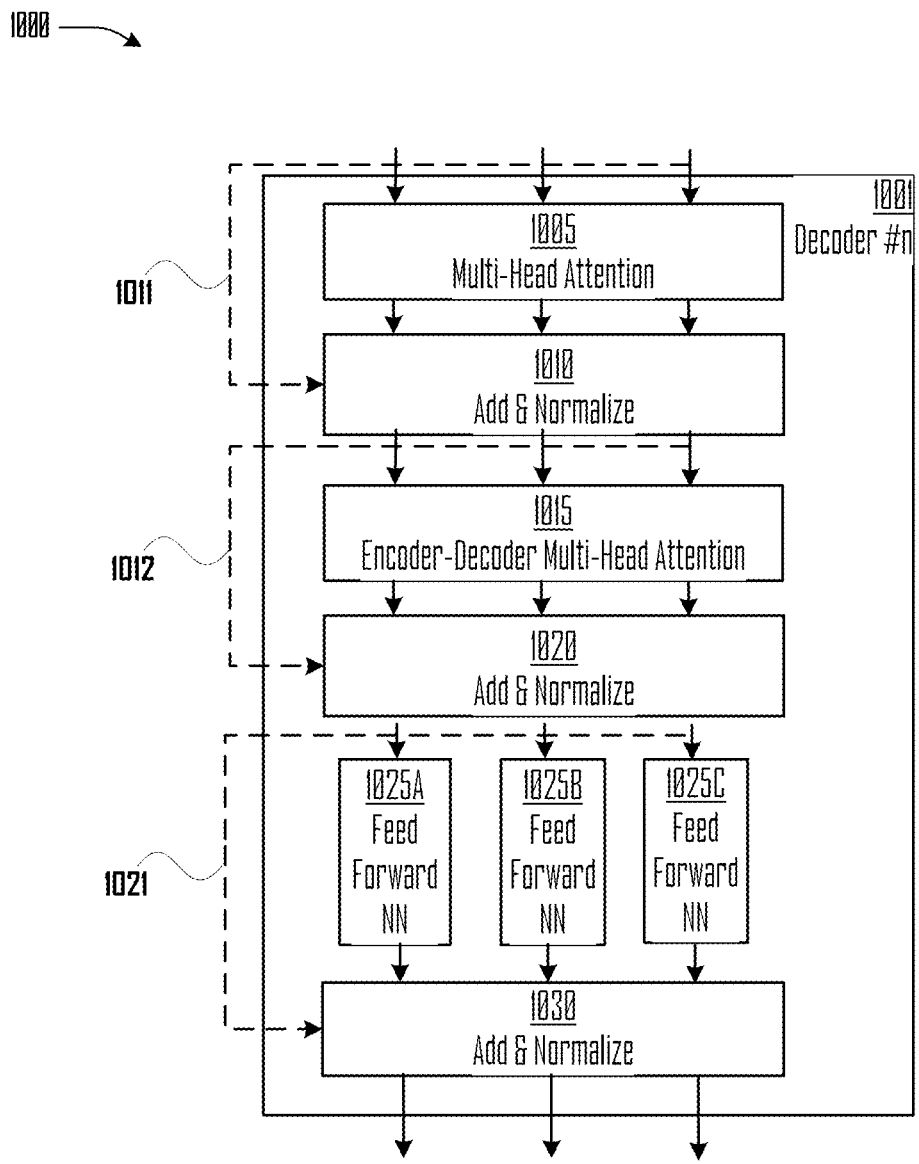
FIG. 10 is a flow diagram illustrating an example of a method performed by a decoder module, according to some embodiments.

FIG. 10 is a flow diagram illustrating an example of a method performed by decoder module 1000, according to an embodiment. Decoder module 1000 may be performed by test strip reader computer device(s), such as test strip reader computer 200, according to some embodiments. These modules may be performed by or with assistance of a hardware accelerator, such as hardware acceleration module 210.

Decoder layers created by decoder module 1000 are identical, though do not necessarily share weights.

Decoder module 1000 receives input tensors, such as from a preceding encoder layer or a preceding decoder layer. The input tensors flow into a multi-head attention layer 1005. Multi-head attention block 1005 and add and normalize block 1010 are substantially similar to multi-head attention block 905 and add and normalize block 905, including residual 1011, though using different weights trained jointly with the model.

However, before proceeding to feedforward neural network 1025A, 1025B, 1025C, etc., output from add and normalize block 1010 flows to an encoder-decoder multi-head attention block 1015 and, from there, to add and normalize block 1020. The encoder-decoder multi-head attention block 1015 is substantially similar to multi-head attention block 1015, though it creates its queries matrix from a layer below it and takes the key matrix and value matrix from the output of the encoder stack. Add and normalize block 1020 is substantially similar to add and normalize block 1010, though it receives a residual 1012 from add and normalize block 1010.

During training, such as with training module 246, the untrained module goes through the same process performed by image feature processing module 600, detect and extract strip module 605, detect diagnostic zone module 620, detect control zone module 620, and image feature classification module 700. However, because it is untrained, output of the modules is compared to tagged (generally correct) results. The weights for each module are optimized to reduce a loss function for the module.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions. USB (Universal serial bus) may comply or be compatible with Universal Serial Bus Specification, Revision 2.0, published by the Universal Serial Bus organization, Apr. 27, 2000, and/or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and/or later and/or related versions of this specification.

As used in any embodiment herein, the term "logic" may refer to the logic of the instructions of an app, software, and/or firmware, and/or the logic embodied into a programmable circuitry by a configuration bit stream, to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as FPGA. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

As used herein, the term "module" (or "logic") may refer to, be part of, or include an Application Specific Integrated Circuit (ASIC), a System on a Chip (SoC), an electronic circuit, a programmed programmable circuit (such as, Field Programmable Gate Array (FPGA)), a processor (shared, dedicated, or group) and/or memory (shared, dedicated, or group) or in another computer hardware component or device that execute one or more software or firmware programs having executable machine instructions (generated from an assembler and/or a compiler) or a combination, a combinational logic circuit, and/or other suitable components with logic that provide the described functionality. Modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

As used herein, a process corresponds to an instance of a program, e.g., an application program, executing on a processor and a thread corresponds to a portion of the process. A processor may include one or more execution core(s). The processor may be configured as one or more socket(s) that may each include one or more execution core(s).

Following are non-limited examples, illustrating use of the disclosure, herein.

Example 1

An apparatus for determining a result of a diagnostic test strip (DTS), comprising: a computer processor and a memory; wherein the memory comprises a trained transformer DTS reader module to determine the result of the DTS, wherein to determine the result of the DTS, the trained transformer DTS reader module is to obtain an image, determine if the image contains the DTS and, when the image is determined to contain the DTS, the trained transformer DTS reader module is to determine a diagnostic zone of the DTS and is to classify a test result of the DTS within the diagnostic zone of the DTS, wherein the apparatus comprises one or both of a mobile computer device and a server computer device and wherein the trained transformer DTS reader module may be performed by such one or both the mobile computer device and the server computer device.

Example 2

The apparatus according to Example 1, wherein the trained transformer DTS reader module comprises a layered network of encoder and decoder modules, wherein to determine the result of the DTS, the trained transformer DTS reader module is to convert the image into a plurality of image feature channels and is to parallel process the plurality of image feature channels with the layered network of encoder and decoder modules to determine the result of the DTS.

Example 3

The apparatus according to Example 2, wherein the layered network of encoder and decoder modules comprises a plurality of encoder modules, a plurality of decoder modules, and a plurality of trained weights.

Example 4

The apparatus according to Example 2, wherein to convert the image into image feature channels comprises to pass the image to a convolutional neural network or an image-to-image-feature channel conversion module in the layered network of encoder and decoder modules to convert the image into the plurality of image feature channels.

Example 5

The apparatus according to Example 3, wherein the layered network of encoder and decoder modules comprises an image feature processing module.

Example 6

The apparatus according to Example 5, wherein the image feature processing module comprises at least one of a detect and extract DTS module, a detect diagnostic zone module, and a detect control zone module.

Example 7

The apparatus according to Example 3, wherein the plurality of encoder modules each comprise an attention circuit, a first residual addition and normalization circuit, a feed-forward neural network, and a second residual addition and normalization circuit.

Example 8

The apparatus according to Example 3, wherein the plurality of decoder modules each comprise an attention circuit, a first residual addition and normalization circuit, a second residual addition and normalization circuit, an encoder-decoder attention circuit, a feed-forward neural network, and a third residual addition and normalization circuit.

Example 9

The apparatus according to one or more of Example 7 and Example 8, wherein the attention circuit comprises a plurality of attention heads, wherein each attention head in the plurality of attention heads is to use a different subset of the plurality of trained weights.

Example 10

The apparatus according to Example 3, wherein the plurality of trained weights comprise a plurality of query weights, a plurality of key weights, and a plurality of value weights.

Example 11

The apparatus according to Example 3, wherein the plurality of encoder modules are identical except that each encoder module in the plurality of encoder modules is to use a different subset of the plurality of the trained weights.

Example 12

The apparatus according to Example 3, wherein the plurality of decoder modules are identical except that each decoder module in the plurality of decoder modules is to use a different subset of the plurality of trained weights.

Example 13

The apparatus according to Example 1, wherein the trained transformer DTS reader module is further to classify a control result of the DTS within a control zone of the DTS.

Example 14

The apparatus according to Example 1, wherein the trained transformer DTS reader module is to be trained on a first portion of a plurality of classified DTS images to develop at least one of plurality of trained weights to be used by the trained transformer DTS reader module, and wherein a second portion of the plurality of classified DTS images are to be used to validate performance of the trained weights.

Example 15

A computer implemented method for determining a result of a diagnostic test strip (DTS), comprising: determining a plurality of image feature channels from an image, parallel processing the plurality of image feature channels with a first layered network of encoders and decoders and determining that the image contains the DTS, parallel processing a plurality of image feature channels corresponding to the DTS with a second layered network of encoders and decoders and determining a diagnostic zone of the DTS, and parallel processing a plurality of image feature channels corresponding to the diagnostic zone with a third layered network of encoders and decoders to classify a test result of the DTS within the diagnostic zone of the DTS.

Example 16

The method according to Example 15, further comprising parallel processing the plurality of image feature channels with a plurality of trained weights.

Example 17

The method according to Example 15, wherein determining the plurality of image feature channels from the image comprises processing the image with at least one of a convolutional neural network or a layered network of encoders and decoders.

Example 18

The method according to Example 15, wherein parallel processing the plurality of image feature channels with a first layered network of encoders and decoders and determining that the image contains the DTS further comprises determining that image comprises at least one of the diagnostic zone and a control zone.

Example 19

The method according to Example 15, wherein parallel processing comprises parallel processing with an attention circuit, a first residual addition and normalization circuit, a feed-forward neural network, and a second residual addition and normalization circuit.

Example 20

The method according to Example 15, wherein parallel processing comprises parallel processing with an attention circuit, a first residual addition and normalization circuit, a second residual addition and normalization circuit, an encoder-decoder attention circuit, a feed-forward neural network, and a third residual addition and normalization circuit.

Example 21

The method according to one or more of Example 19 and Example 20, wherein the attention circuit comprises a plurality of attention heads, wherein each attention head in the plurality of attention heads uses a different subset of the plurality of trained weights.

Example 22

The method according to Example 16, wherein the plurality of trained weights comprise a plurality of query weights, a plurality of key weights, and a plurality of value weights.

Example 23

The method according to Example 15, wherein layered network of encoders and decoders are identical except that they use a different subset of a plurality of the trained weights.

Example 24

The method according to Example 15, further comprising classifying a control result of the DTS within a control zone of the DTS.

Example 25

The method according to Example 15, further comprising training at least the first layered network of encoders and decoders on a first portion of a plurality of classified DTS images to develop at least one of plurality of trained weights and validating performance of the trained weights with a second portion of the plurality of classified DTS images.

Example 26

A computer apparatus for determining a result of a diagnostic test strip (DTS), comprising: means to determine a plurality of image feature channels from an image, means to parallel process the plurality of image feature channels with a first layered network of encoders and decoders and determine that the image contains the DTS, means to parallel process a plurality of image feature channels corresponding to the DTS with a second layered network of encoders and decoders to determine a diagnostic zone of the DTS, and means to parallel process a plurality of image feature channels corresponding to the diagnostic zone with a third layered network of encoders and decoders to classify a test result of the DTS within the diagnostic zone of the DTS.

Example 27

The apparatus according to Example 26, further comprising means to parallel process the plurality of image feature channels with a plurality of trained weights.

Example 28

The apparatus according to Example 26, wherein means to determine the plurality of image feature channels from the image comprises means to process the image with at least one of a convolutional neural network or a layered network of encoders and decoders.

Example 29

The apparatus according to Example 26, wherein means to parallel process the plurality of image feature channels with a first layered network of encoders and decoders and determine that the image contains the DTS further comprises means to determine that image comprises at least one of the diagnostic zone and a control zone.

Example 30

The apparatus according to Example 26, wherein means to parallel process comprises means to parallel process with means for an attention circuit, means for a first residual addition and normalization circuit, means for a feed-forward neural network, and means for a second residual addition and normalization circuit.

Example 31

The apparatus according to Example 26, wherein means to parallel process comprises means to parallel process with means for an attention circuit, means for a first residual addition and normalization circuit, means for a second residual addition and normalization circuit, means for an encoder-decoder attention circuit, means for a feed-forward neural network, and means for a third residual addition and normalization circuit.

Example 32

The apparatus according to one or more of Example 30 and Example 31, wherein the means for the attention circuit comprises a plurality of attention heads, wherein each attention head in the plurality of attention heads uses a different subset of the plurality of trained weights.

Example 33

The apparatus according to Example 27, wherein the plurality of trained weights comprise a plurality of query weights, a plurality of key weights, and a plurality of value weights.

Example 34

The apparatus according to Example 26, wherein the first layered network of encoders and decoders and the second layered network of encoders and decoders are identical except that they use a different subset of the plurality of the trained weights.

Example 35

The apparatus according to Example 26, further comprising means to classify a control result of the DTS within a control zone of the DTS.

Example 36

The apparatus according to Example 26, further comprising means to train at least the first layered network of encoders and decoders on a first portion of a plurality of classified DTS images to develop at least one of plurality of trained weights and means to validate performance of the trained weights with a second portion of the plurality of classified DTS images.

Example 37

One or more computer-readable media comprising instructions that cause a computer device, in response to execution of the instructions by a processor of the computer device, to: determine a plurality of image feature channels from an image, parallel process the plurality of image feature channels with a first layered network of encoders and decoders and determine that the image contains a diagnostic test strip ("DTS"), parallel process a plurality of image feature channels corresponding to the DTS with a second layered network of encoders and decoders to determine a diagnostic zone of the DTS, and parallel process a plurality of image feature channels corresponding to the diagnostic zone with a third layered network of encoders and decoders to classify a test result of the DTS within the diagnostic zone of the DTS.

Example 38

The computer-readable media according to Example 37, wherein the instructions further cause the computer device, in response to execution of the instructions by the processor of the computer device, to parallel process the plurality of image feature channels with a plurality of trained weights.

Example 39

The computer-readable media according to Example 37, wherein the instructions further cause the computer device, in response to execution of the instructions by the processor of the computer device, to process the image with at least one of a convolutional neural network or a layered network of encoders and decoders to determine the plurality of image feature channels from the image comprises.

Example 40

The computer-readable media according to Example 37, wherein the instructions further cause the computer device, in response to execution of the instructions by the processor of the computer device, to parallel process the plurality of image feature channels with a first layered network of encoders and decoders and determine that the image contains the DTS further and to determine that image comprises at least one of the diagnostic zone and a control zone.

Example 41

The computer-readable media according to Example 37, wherein to parallel process comprises to parallel process with an attention circuit, a first residual addition and normalization circuit, a feed-forward neural network, and a second residual addition and normalization circuit.

Example 42

The computer-readable media according to Example 37, wherein to parallel process comprises to parallel process with an attention circuit, a first residual addition and normalization circuit, a second residual addition and normalization circuit, an encoder-decoder attention circuit, a feed-forward neural network, and a third residual addition and normalization circuit.

Example 43

The computer-readable media according to one or more of Example 41 and Example 42, wherein the attention circuit comprises a plurality of attention heads, wherein each attention head in the plurality of attention heads uses a different subset of the plurality of trained weights.

Example 44

The computer-readable media according to Example 38, wherein the plurality of trained weights comprise a plurality of query weights, a plurality of key weights, and a plurality of value weights.

Example 45

The computer-readable media according to Example 37, wherein the first layered network of encoders and decoders and the second layered network of encoders and decoders are identical except that they use a different subset of the plurality of the trained weights.

Example 46

The computer-readable media according to Example 37, wherein the instructions further cause the computer device, in response to execution of the instructions by the processor of the computer device, to classify a control result of the DTS within a control zone of the DTS.

Example 47

The computer-readable media according to Example 37, wherein the instructions further cause the computer device, in response to execution of the instructions by the processor of the computer device, to train at least the first layered network of encoders and decoders on a first portion of a plurality of classified DTS images to develop at least one of plurality of trained weights and to validate performance of the trained weights with a second portion of the plurality of classified DTS images.

The invention claimed is:

1. An apparatus for determining a result of a diagnostic test strip (DTS), comprising: a computer processor and a memory; wherein the memory comprises a trained transformer DTS reader module to determine the result of the DTS, wherein to determine the result of the DTS, the trained transformer DTS reader module is to obtain an image, determine if the image contains the DTS and, when the image is determined to contain the DTS, the trained transformer DTS reader module is to determine a diagnostic zone of the DTS and is to classify a test result of the DTS within the diagnostic zone of the DTS, wherein the trained transformer DTS reader module comprises a layered network of encoder and decoder modules, wherein to determine the result of the DTS, the trained transformer DTS reader module is to convert the image into a plurality of image feature channels and is to parallel process the plurality of image feature channels with the layered network of encoder and decoder modules to determine the result of the DTS.

2. The apparatus according to claim 1, wherein the layered network of encoder and decoder modules comprises a plurality of encoder modules, a plurality of decoder modules, and a plurality of trained weights.

3. The apparatus according to claim 2, wherein the layered network of encoder and decoder modules comprises an image feature processing module.

4. The apparatus according to claim 3, wherein the image feature processing module comprises at least one of a detect and extract DTS module, a detect diagnostic zone module, and a detect control zone module.

5. The apparatus according to claim 2, wherein the plurality of encoder modules are identical except that each encoder module in the plurality of encoder modules is to use a different subset of the plurality of the trained weights.

6. The apparatus according to claim 1, wherein the trained transformer DTS reader module is further to classify a control result of the DTS within a control zone of the DTS.

7. A computer implemented method for determining a result of a diagnostic test strip (DTS), comprising: determining a plurality of image feature channels from an image, parallel processing the plurality of image feature channels with a first layered network of encoders and decoders and determining that the image contains the DTS, parallel processing a plurality of image feature channels corresponding to the DTS with a second layered network of encoders and decoders and determining a diagnostic zone of the DTS, and parallel processing a plurality of image feature channels corresponding to the diagnostic zone with a third layered network of encoders and decoders to classify a test result of the DTS within the diagnostic zone of the DTS.

8. The method according to claim 7, further comprising parallel processing the plurality of image feature channels with a plurality of trained weights.

9. The method according to claim 7, wherein parallel processing the plurality of image feature channels with a first layered network of encoders and decoders and determining that the image contains the DTS further comprises determining that image comprises at least one of the diagnostic zone and a control zone.

10. The method according to claim 7, wherein layered network of encoders and decoders are identical except that they use a different subset of a plurality of trained weights.

11. The method according to claim 7, further comprising classifying a control result of the DTS within a control zone of the DTS.

12. The method according to claim 7, further comprising training at least the first layered network of encoders and decoders on a first portion of a plurality of classified DTS images to develop at least one of plurality of trained weights and validating performance of the trained weights with a second portion of the plurality of classified DTS images.

13. One or more computer-readable media comprising instructions that cause a computer device, in response to execution of the instructions by a processor of the computer device, to: determine a plurality of image feature channels from an image, parallel process the plurality of image feature channels with a first layered network of encoders and decoders and determine that the image contains a diagnostic test strip ("DTS"), parallel process a plurality of image feature channels corresponding to the DTS with a second layered network of encoders and decoders to determine a diagnostic zone of the DTS, and parallel process a plurality of image feature channels corresponding to the diagnostic zone with a third layered network of encoders and decoders to classify a test result of the DTS within the diagnostic zone of the DTS.

14. The computer-readable media according to claim 13, wherein the instructions further cause the computer device, in response to execution of the instructions by the processor of the computer device, to parallel process the plurality of image feature channels with a plurality of trained weights.

15. The computer-readable media according to claim 13, wherein the instructions further cause the computer device, in response to execution of the instructions by the processor of the computer device, to parallel process the plurality of image feature channels with a first layered network of encoders and decoders and determine that the image contains the DTS further and to determine that image comprises at least one of the diagnostic zone and a control zone.

16. The computer-readable media according to claim 13, wherein to parallel process comprises to parallel process with an attention circuit, a first residual addition and normalization circuit, a feed-forward neural network, and a second residual addition and normalization circuit.

17. The computer-readable media according to claim 13, wherein to parallel process comprises to parallel process with an attention circuit, a first residual addition and normalization circuit, a second residual addition and normalization circuit, an encoder-decoder attention circuit, a feed-forward neural network, and a third residual addition and normalization circuit.

18. The computer-readable media according to claim 13, wherein the first layered network of encoders and decoders and the second layered network of encoders and decoders are identical except that they use a different subset of a plurality of trained weights.

19. The computer-readable media according to claim 13, wherein the instructions further cause the computer device, in response to execution of the instructions by the processor of the computer device, to classify a control result of the DTS within a control zone of the DTS.

* * * * *